United States Patent [19]

Harrison

[11] Patent Number: 4,508,140

[45] Date of Patent: Apr. 2, 1985

[54] HYDRAULIC FLOW CONTROL VALVES

[75] Inventor: Anthony W. Harrison, Birmingham, England

[73] Assignee: Lucas Industries public limited company, Birmingham, England

[21] Appl. No.: 588,381

[22] Filed: Mar. 12, 1984

[30] Foreign Application Priority Data

Mar. 12, 1983 [GB] United Kingdom ............... 8306852

[51] Int. Cl.³ .......................................... F16K 31/365
[52] U.S. Cl. .................................. 137/501; 137/505.18
[58] Field of Search ................... 137/501, 521, 505.18; 251/243

[56] References Cited

U.S. PATENT DOCUMENTS

| 172,163 | 1/1876 | Peebles | 137/501 |
| 2,627,281 | 2/1953 | Moore | 137/501 |

FOREIGN PATENT DOCUMENTS

| 706982 | 7/1931 | France | 137/521 |
| 1409304 | 10/1975 | United Kingdom | 137/501 |

Primary Examiner—Martin P. Schwadron
Assistant Examiner—Stephen M. Hepperle
Attorney, Agent, or Firm—Oldham, Oldham & Weber Co.

[57] ABSTRACT

The regulator valve has a first restriction of fixed size in series with a second, variable restriction defined between a tilting wall and an annular valve seat provided on a fixed wall. The tilting wall is sealed around its periphery to the fixed wall by an elastomeric membrane to define between the walls a first chamber, and the walls are biassed apart by a compression spring. A second chamber is defined on the opposite side of the tilting wall to the first chamber such that the tilting wall is subject to the pressure differential between the first and second chambers, and the first restriction connects the two chambers. The size of the second restriction is thereby made dependent upon the pressure difference between the two chambers. The tilting wall tilts about a fulcrum line. The valve seat may be pressure-balanced by a balancing member.

9 Claims, 5 Drawing Figures

HYDRAULIC FLOW CONTROL VALVES

This invention relates to hydraulic flow control valves and particularly to a regulator valve of the kind in which a first restriction of predetermined size is connected in series with a second restriction defined between two relatively movable members, relative movement of the members being controlled by the difference in fluid pressure across the first restriction such that an increase in the pressure difference causes a reduction in the size of the second restriction. Such a valve will hereinafter be referred to as a 'regulator valve of the kind set forth'.

Known regulator valves of the kind set forth generally employ a match ground close fitting cylindrical valve member which is not only expensive to produce with sufficient accuracy but has a significant probability of failure due to sticking. A regulator valve of this kind is shown for example in Specification G.B. No. 2045372A.

An attempt at designing a less expensive regulator valve is shown in U.K. Specification No. 1409304. The valve has a valve plate slidably mounted in a housing, the plate being provided with an orifice constituting the first restriction and biassed away from a valve seat by an O-ring which also acts as a seal between the plate and the housing. The spacing between the valve plate and the valve seat provides the second restriction of variable size. A problem with that arrangement is that because the valve plate is slidably mounted in the housing, failure of the valve can occur with the plate jammed in a position in which the plate is closing the valve seat, and this would be dangerous in certain situations, for example in some vehicle hydraulic systems such as brake systems. The pressure differential across the valve plate may also move the O-ring radially away from the adjacent housing wall which could lead to irregularities in the valve characteristics.

According to one aspect of the invention in a regulator valve of the kind set forth the relatively movable members comprise two opposing rigid walls which have a rocking engagement with each other and are sealed together around their peripheries by a sealing membrane which accommodates limited relative rocking movement of the walls, the confronting inner faces of the walls together with the sealing membrane bound a first chamber, an outer face of a first of said walls is exposed to the pressure in a second chamber, and the first restriction is arranged to connect the first and second chambers, the second restriction provides communication between the first chamber and a transfer passage which is provided in the second wall, the second restriction being defined between a valve member portion of the first wall spaced from the rocking engagement and a valve seat portion of the second wall surrounding one end of the first transfer passage, and resilient means biases the walls in the direction to increase the size of the second restriction.

The use of a rocking engagement between the walls and a membrane seal reduces the risk of the valve failing in the condition in which the valve seat is closed.

Since the sealing of the first chamber is effected by a membrane the need for match grinding of the relatively movable members is avoided.

The membrane conveniently comprises an annular elastomeric sleeve which sealingly engages at its opposite axial ends with the peripheries of the respective walls.

Preferably the sleeve is provided by the wall of a cup-shaped elastomeric member in which the first wall is seated, the rim of the cup-shaped member being sealingly secured to the periphery of the second wall.

The intended direction of flow through the valve is from the second chamber to the transfer passage.

In order to minimise any change in flow rate through the regulator with applied fluid pressure the diameter of the valve seat portion is preferably made as small as possible in relation to the overall transverse dimensions of the first wall.

Alternatively, or in addition, a pressure balancing projection may be provided on the second wall which comprises a stem extending through the valve seat into the transfer passage, and a head which is received in a recess in the outer face of the first wall thereby to reduce the effective area of said outer face by the area of the head. The area of the head may then be made substantially equal to the effective cross-sectional area of the valve seat.

The resilient means is preferably arranged in a position which is off-set from the valve seat.

Conveniently the resilient means is housed in a bore in the second wall that is on the opposite side of the axis of the valve seat to the rocking axis.

Preferably the rocking engagement is provided by a fulcrum line defined on the inner surface of the second wall by suitable shaping of said inner surface.

The shaping to provide the fulcrum line is preferably a chamfer of the said inner surface.

According to a second aspect of the invention in a regulator valve of the kind set forth the relatively movable members comprise two opposing rigid walls which are sealed together around their peripheries by a sealing membrane which accommodates limited relative movement apart of the walls, the confronting inner faces of the walls together with the sealing membrane bound a first chamber, an outer face of a first of said walls is exposed to the pressure in the second chamber, and the first restriction is arranged to connect the first and second chambers, the second restriction provides communication between the first chamber and a transfer passage which is provided in the second wall, the second restriction being defined between a valve member portion of the first wall and a valve seat portion of the second wall surrounding one end of the first transfer passage, one of the walls is provided with a series of recesses extending substantially radially from adjacent to the radially outer margin of the valve seat, and resilient means biases the walls in the direction to increase the size of the second restriction.

The radial recesses can be dimensioned to control the degree of damping produced by the squish action between the confronting faces of the walls.

The valve seat is preferably encircled by a co-axial annular recess into which the radial recesses lead at their radially inner ends.

Preferably the radial recesses are provided in the inner faces of the second wall.

The walls of the regulator valve in accordance with the second aspect of the invention may be relatively movable without tilting, but preferably the walls are arranged to have a rocking engagement with each other in accordance with the first aspect of the invention.

The invention will now be further described, by way of example only, with reference to the accompanying drawings in which:

FIG. 1 schematically illustrates the principle of regulator valves in accordance with the invention;

Figure 1:
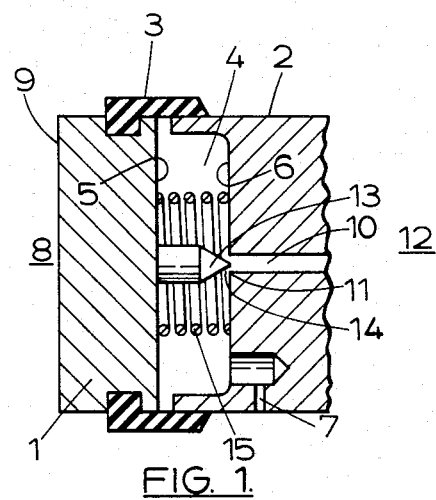

The principle of operation of regulator valves in accordance with the invention will first be explained. With reference to FIG. 1, first and second rigid walls 1, 2 are connected around their peripheries by an annular elastomeric membrane 3 which is sealingly secured in suitable manner to both walls 1, 2. A first chamber 4 is defined between confronting inner faces 5, 6 respectively of the walls 1, 2. A first, fixed restriction in the form of an orifice 7 provides fluid communication for hydraulic fluid between a high pressure second chamber 8 bounding the outer wall 9 of the first wall 1. A transfer passage 10, in this case the outlet passage of the assembly connecting with a low pressure chamber 12, extends through the second wall 2 from a valve seat 11, between which and a valve member 13 is defined a second, variable restriction 14. Valve member 13 is indicated schematically as a cone valve, but in practice the wall 1 is arranged to act as a plate valve member, as described hereafter.

A compression spring 15 urges walls 1, 2 relatively apart and provides a balancing force to create a defined pressure drop through the first restriction 7.

Figure 2:
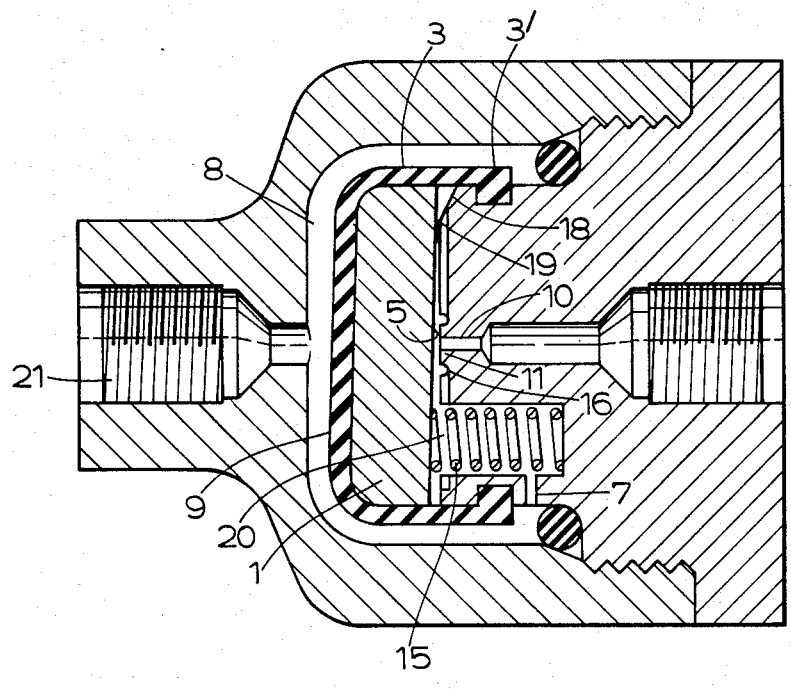
FIG. 2 is a schematic longitudinal cross-sectional view of a practical regulator valve assembly in accordance with the invention, but with the valve clearance exaggerated for illustration.
Figure 3:
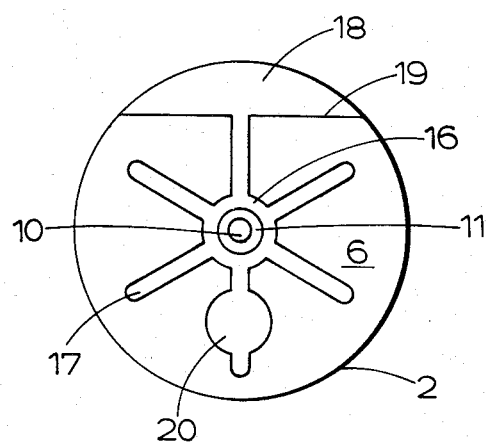
FIG. 3 is a view looking from the left in FIG. 2 of the valve wall provided with the annular valve seat.

FIGS. 2 and 3 show a practical construction utilising the principles of FIG. 1. Parts corresponding to those of FIG. 1 have been given corresponding reference numerals. The tilt of the wall 1 in FIG. 2 is exaggerated for the purposes of illustration.

The first wall is in the form of a rigid circular valve plate 1 and is held in contact with the face of a second wall in the form of a rigid plug 2 by a rubber cup 3, the rim 1 of the cup being formed as a bead 3' which is seated in an external annular recess in the plug 2. The surface 6 is pierced by the central outlet passage 10, and an annular land 11 encircles the passage 10 to provide a valve seat.

The land 11 is encircled by an annular recess 16 from which extend six radial recesses 17. Damping to inhibit vibration is produced by the squish action generated by the flat surfaces 5, 6 in close proximity. The degree of damping produced by the squish action can be optimised by choosing an appropriate area for the grooves 17.

A small segment 18 of the surface 6 is chamfered to define a fulcrum line 19 about which the valve plate 1 is rockable to define the variable second restriction between the land 11 and the confronting surface 5 of the plate 1. A spring 15 is housed in a bore 20 of the plug 2 positioned diametrically opposite to the fulcrum 19.

The operation of the assembly of FIG. 2 is essentially the same as that of FIG. 1 when inlet port 21 is connected to a high pressure supply, except that it will be appreciated that the valve plate 1 simply tilts about fulcrum line 19 in response to changes in the pressure at inlet 21.

It will be appreciated that there is virtually no possibility of the valve plate 1 jamming in use. In addition the only surfaces requring accurate machining are the flat areas of opposing surfaces 5, 6 of the valve plate 1 and plug 2, and this presents no difficulties.

The cup 3 performs the various functions of retaining the plate 1 in a generally central position with respect to the axis of passage 10, holding the plate against the fulcrum line 19, and also sealing the chamber 4.

All of these features help to reduce manufacturing costs.

Figure 4:
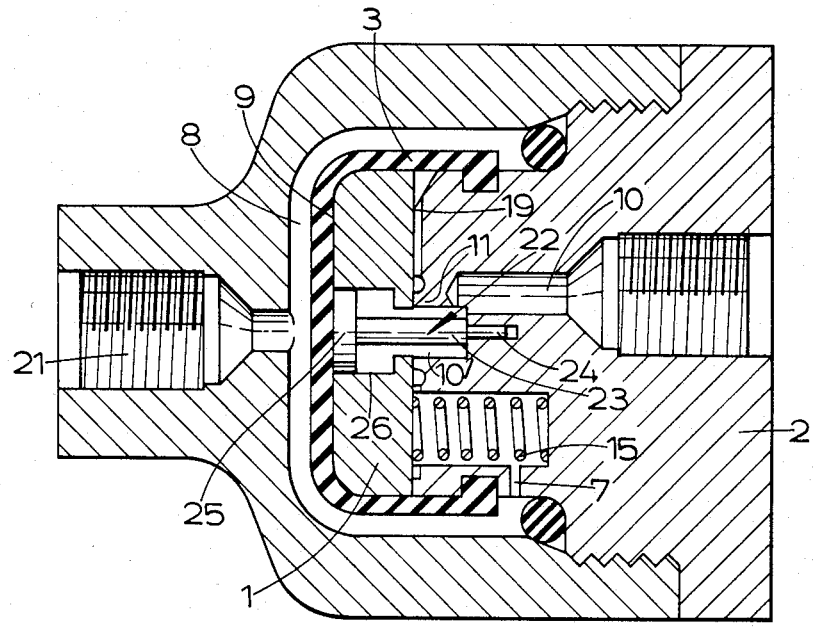
FIG. 4 is a schematic longitudinal cross-section of a modification of the regulator valve assembly of FIG. 2.

The assembly of FIG. 4 is essentially the same as that of FIG. 2 except for the provision of a pressure balancing projection 22 which comprises a stem 23 having a reduced end 24 loosely received in a bore of the plug 2, the stem 23 extending through the portion 10' of the passage 10 and through the centre of valve seat 11, and a head 25 received in a recess 26 in the outer face 9 of valve plate 1. The head 25 is made of a diameter substantially equal to the effective diameter of valve seat 11 and transfers to the plug 2 the force of the pressure in chamber 8 applied to cup 3 over the area of head 25, thereby to balance the valve action between plate 1 and seat 11.

Figure 5:
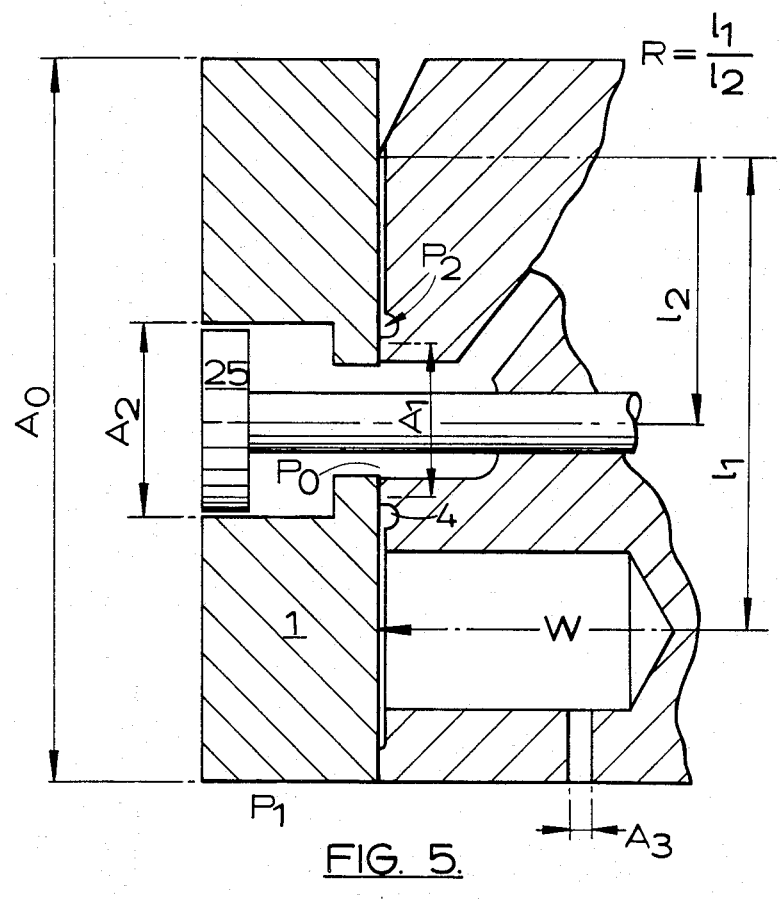
FIG. 5 is a drawing indicating the important dimensions of the assembly of FIG. 4.

There now follows with reference to FIG. 5 a calculation which demonstrates the characteristics of the assembly of FIG. 4, but which is also relevant to the arrangement of FIG. 2.

Notation:

$A_0$—area of valve plate 1 including area of head 25 of balancing projection $A_1$—effective area of valve seat 11

$A_2$—balancing area of head 25

$A_3$—cross-sectional area of fixed orifice 7

$P_0$—outlet pressure in transfer passage 10

$P_1$—supply pressure in chamber 8

$P_2$—intermediate pressure in chamber 4

W—load of spring 15

R—spring mechanical advantage when referred to valve seat 11

Q—quantity of flow per sec.

The calculations will assume that the orifice is short and has a square law characteristic:

$$(P_1 - P_2) = (Q/A_3)^2 K \tag{1}$$

(where K is a constant)

Suitable allowance must be made for any other characteristics of the orifice.

At load balance on the valve plate 1:

$$P_1(A_0 - A_2) + P_0(A_2 - A_1) = P_2(A_0 - A_1) + WR$$
$$\therefore P_2 = [P_1(A_0 - A_2) + P_0(A_2 - A_1) - WR]/(A_0 - A_1) \tag{2}$$

Substituting (2) in (1):

$$Q = A_3 \sqrt{[(P_1 - P_0)(A_2 - A_1) + WR]/(A_0 - A_1)K} \tag{3}$$

note that if $A_2 = A_1$ (for perfect pressure balancing)

$$Q = A_3 \sqrt{WR/(A_0 - A_1)K} \tag{4}$$

which shows that the flow rate is independent of the inlet and outlet pressures (i.e. constant flow). If, as in FIG. 2, there is not balancing projection. $A_2 = 0$ and;

$$Q = A_3 \sqrt{[(P_1 - P_0)(-A_1) + WR]/(A_0 - A_1)K}$$

This shows the obvious case where if the pressure difference causes a valve load $[(P_1-P_0)A_1]$ greater than the spring load WR the valve snaps shut uncontrollably. The spring 15 must therefore have a load greater than $$W=(P_1-P_0)A_1/R$$

What is claimed is:

1. A regulator valve comprising first and second opposing rigid walls, portions of said walls having a rocking engagement with each other, a sealing membrane sealingly connecting together said walls around their peripheries and permitting relative rocking movement of said walls, confronting inner faces of said walls together with said sealing membrane bounding a first chamber, an outer face of said first wall bounding a second chamber, a first restriction of predetermined size connecting said first and second chambers, said second wall being formed with a transfer passage spaced from said rocking engagement, said inner face of said second wall being provided with a valve seat portion surrounding the end of said transfer passage adjacent to said first wall, a valve member portion of said inner face of said first wall defining with said valve seat portion a second restriction of variable size, and resilient means acting between said walls in the direction to increase the size of said second restriction, whereby an increase in the pressure in said second chamber relative to the pressure in said transfer passage brings about a reduction in the size of said second restriction.

2. A regulator valve as in claim 1 wherein said membrane comprises an annular elastomeric sleeve which sealingly engages at its opposite axial ends with the peripheries of said walls.

3. A regulator valve as in claim 2 wherein said membrane is a cup-shaped elastomeric member in which said first wall is seated, the rim of said cup-shaped member constituting said sleeve.

4. A regulator valve as in claim 1 wherein said inner face of one of said walls is formed with a chamfer to define a fulcrum line providing said rocking engagement.

5. A regulator valve as in claim 3 comprising a pressure balancing projection, said projection comprising a head which is received in a recess provided in the outer face of said first wall in engagement with said cup-shaped member, and a stem extending into said transfer passage.

6. A regulator valve comprising first and second opposing rigid walls, a sealing membrane sealingly connecting together said walls around their peripheries and permitting movement of said walls towards and away from each other, confronting inner faces of said walls together with said sealing membrane bounding a first chamber, an outer face of said first wall bounding a second chamber, a first restriction of predetermined size connecting said first and second chambers, said second wall being formed with a transfer passage, said inner face of said second wall being provided with a valve seat portion surrounding the end of said transfer passage adjacent to said first wall, a valve member portion of said inner face of said first wall defining with said valve seat portion a second restriction of variable size, and resilient means acting between said walls in the direction to increase the size of said second restriction, whereby an increase in the pressure in said second chamber relative to the pressure in said transfer passage brings about a reduction in the size of said second restriction, one of said inner faces of said walls being formed with a series of recesses extending substantially radially from adjacent to said valve seat.

7. A regulator valve as in claim 6 wherein said one inner face is provided with an annular recess co-axial with said valve seat portion, said radial recesses leading into said annular recess.

8. A regulator valve as in claim 6 whereiin said radial recesses are provided in said inner face of said second wall.

9. A regulator valve as in claim 6 wherein portions of said walls have a rocking engagement with each other at a position spaced from said valve seat portion.

* * * * *